(12) United States Patent
Chen (10) Patent No.: US 10,809,582 B2
(45) Date of Patent: Oct. 20, 2020

(54) DISPLAY DEVICE

(71) Applicant: Au Optronics Corporation, Hsinchu (TW)

(72) Inventor: Ju-Chin Chen, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/358,675

(22) Filed: Mar. 19, 2019

(65) Prior Publication Data

US 2019/0302516 A1     Oct. 3, 2019

(30) Foreign Application Priority Data

Mar. 30, 2018   (TW) .............................. 107111151 A (51) Int. Cl.
   *G02F 1/1347*   (2006.01)
   *G02F 1/1335*   (2006.01)

(52) U.S. Cl.
   CPC ..... *G02F 1/13471* (2013.01); *G02F 1/133512* (2013.01); *G02F 1/133514* (2013.01); *G02F 1/133528* (2013.01)

(58) Field of Classification Search
   None
   See application file for complete search history.

(56) References Cited

U.S. PATENT DOCUMENTS

| | | | |
|---|---|---|---|
| 9,329,425 B2 | 5/2016 | Chen et al. | |
| 9,541,794 B2 | 1/2017 | Wu et al. | |
| 9,772,530 B2 | 9/2017 | Gilbert | |
| 9,864,243 B2 | 1/2018 | Erinjippurath et al. | |
| 2004/0201814 A1 | 10/2004 | Yamamoto | |
| 2009/0146933 A1 | 6/2009 | Visser et al. | |
| 2011/0279749 A1 | 11/2011 | Erinjippurath et al. | |
| 2012/0224121 A1 | 9/2012 | Gilbert | |
| 2015/0226988 A1 | 8/2015 | Chen et al. | |
| 2016/0202512 A1 | 7/2016 | Chen et al. | |
| 2018/0113358 A1* | 4/2018 | Lee .................... H01L 51/5262 | |

FOREIGN PATENT DOCUMENTS

| | | |
|---|---|---|
| CN | 101065705 | 10/2007 |
| CN | 102971663 | 3/2013 |
| TW | 200424613 | 11/2004 |
| TW | 201531777 | 8/2015 |

* cited by examiner

*Primary Examiner* — Phu Vu
(74) *Attorney, Agent, or Firm* — JCIPRNET (57) ABSTRACT

A display device including a color display panel and a switching panel which overlaps the color display panel in a first direction is provided. The color display panel includes a first array substrate, a first opposite substrate, and a first light shielding layer. The first opposite substrate overlaps the first array substrate in the first direction, wherein the first array substrate has a first display region and a first peripheral region located on at least one side of the first display region. The first light shielding layer overlaps the first peripheral region in the first direction. The switching panel comprises a second array substrate and a second opposite substrate. The second opposite substrate overlaps the second array substrate in the first direction, wherein the second array substrate comprises a second display region. The second display region overlaps the first display region and the first peripheral region in the first direction.

10 Claims, 8 Drawing Sheets

DISPLAY DEVICE

CROSS-REFERENCE TO RELATED APPLICATION

This application claims the priority benefit of Taiwan application serial no. 107111151, filed on Mar. 30, 2018. The entirety of the above-mentioned patent application is hereby incorporated by reference herein and made a part of this specification.

BACKGROUND

1. Field of the Invention

This disclosure relates to a display device and, more particularly, to a display device including a switching panel.

2. Description of Related Art

In recent years, in order to solve the problem of color shift in the dark state of a general display at a large viewing angle, a switching panel is often provided between the display panel and the backlight module to increase the contrast of the display.

However, the display panel and the switching panel have problems with the accuracy of alignment, and the overall thickness is increased after the addition of a switching panel, which may easily result in a displacement of the dimming signal at a non-center viewing angle, thereby causing distortion of an image displayed at an edge. Therefore, there is a need to provide a method that can solve the aforementioned problem.

SUMMARY

The present invention provides a display device capable of improving the problem of distortion of an image displayed at an edge at a large viewing angle.

In this disclosure, a display device comprises a color display panel and a switching panel which overlaps the color display panel in a first direction. The color display panel comprises a first array substrate, a first opposite substrate, and a first light shielding layer. The first opposite substrate overlaps the first array substrate in the first direction, wherein the first array substrate has a first display region and a first peripheral region located on at least one side of the first display region. The first light shielding layer overlaps the first peripheral region in the first direction. The switching panel comprises a second array substrate and a second opposite substrate. The second opposite substrate overlaps the second array substrate in the first direction, wherein the second array substrate comprises a second display region. The second display region overlaps the first display region and the first peripheral region in the first direction.

One aspect of this invention is to raise the visual effect of the display device under a large viewing angle.

In order that the above features and advantages of the present invention can be more clearly and easily understood, the following embodiments will be described in detail with the accompanying drawings as follows.

DESCRIPTION OF THE EMBODIMENTS

Figure 1A:
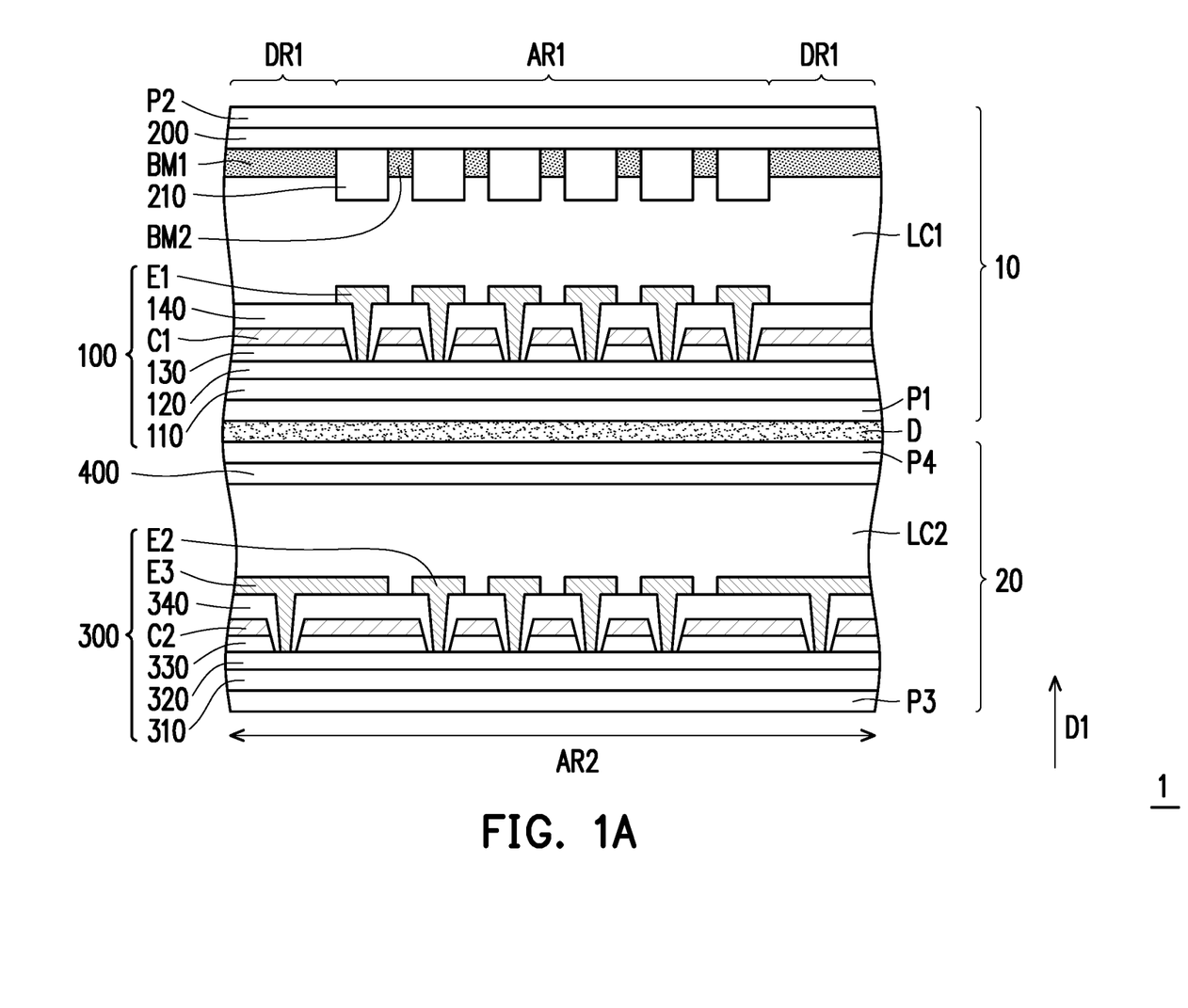
FIG. 1A is a schematic cross-sectional view of a display device according to an embodiment of the present invention.
Figure 1B:
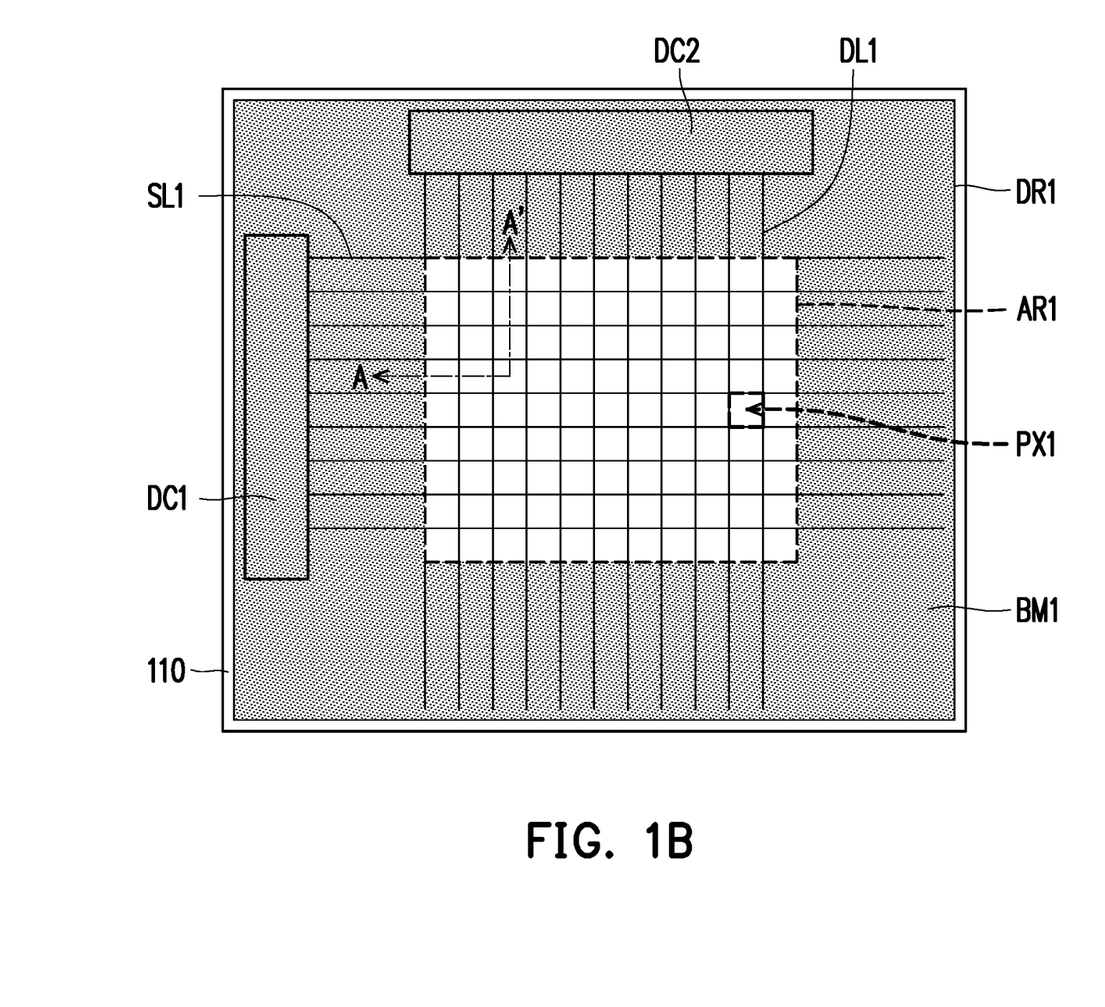
FIG. 1B is a schematic top view of a color display panel according to an embodiment of the present invention.
Figure 1C:
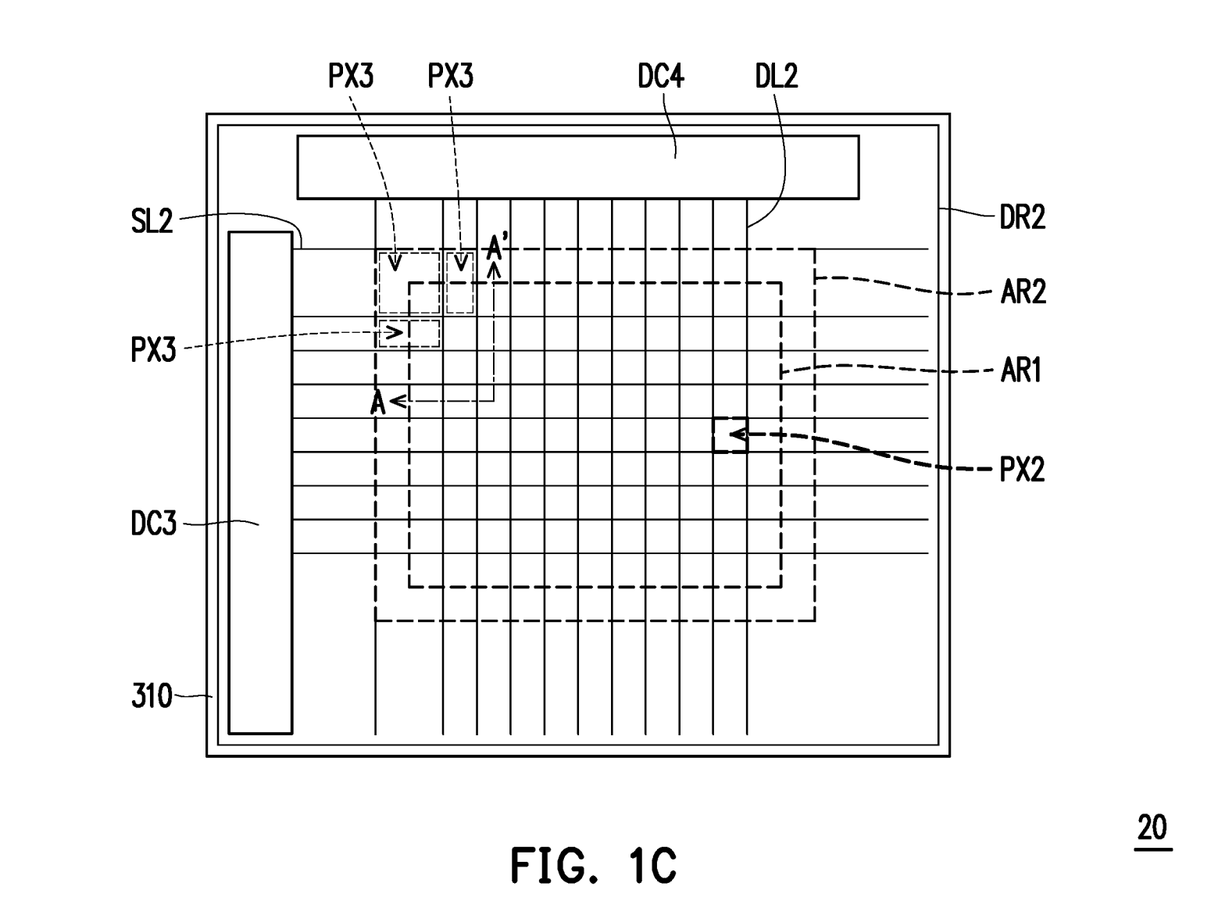
FIG. 1C is a schematic top view of a switching panel according to an embodiment of the present invention.

FIG. 1A is a schematic cross-sectional view of a display device according to an embodiment of the present invention. FIG. 1B is a schematic top view of a color display panel according to an embodiment of the present invention. FIG. 1C is a schematic top view of a switching panel according to an embodiment of the present invention. FIG. 1A is, for example, a position corresponding to the line AA' of FIG. 1B and FIG. 1C. For convenience of explanation, the first active device array and the second active device array in FIG. 1A omits the components of data lines, scan lines, active devices, and passive devices. In FIG. 1B, a substrate, scan lines, data lines, pixel units, a first light shielding layer, and driver circuits are illustrated, and other components are omitted from illustration. In FIG. 1C, a substrate, scan lines, data lines, pixel units, and driver circuits are illustrated, and other components are omitted from illustration.

Referring to FIG. 1A, a display device 1 comprises a color display panel 10 and a switching panel 20 overlapping the color display panel 10 in a first direction D1.

Referring to FIGS. 1A and 1B, the color display panel 10 comprises a first array substrate 100, a first opposite substrate 200, and a first light shielding layer BM1. The first opposite substrate 200 overlaps the first array substrate 100 in the first direction D1. The first light shielding layer BM1 is located between the first array substrate 100 and the first opposite substrate 200. The first array substrate 100 has a first display region AR1 and a first peripheral region DR1 located on at least one side of the first display region AR1. The first light shielding layer BM1 overlaps the first peripheral region DR1 in the first direction D1. In some embodiments, the color display panel 10 further comprises a second light shielding layer BM2 shielding part of the first display region AR1, and the second light shielding layer BM2 covers, for example, the scan lines and the data lines in the first display region AR1. However, this invention is not limited thereto.

A driver circuit DC1 and a driver circuit DC2 are located in the first peripheral region DR1. The scan lines SL1 are electrically connected to the driver circuit DC1 and extend from the first peripheral region DR1 into the first display region AR1. The data lines DL1 are electrically connected to the driver circuit DC2 and extends from the first peripheral region DR1 into the first display region AR1. Although in the present embodiment, the driver circuit DC1 and the driver circuit DC2 are disposed in the first peripheral region DR1, the present invention is not limited thereto. In other embodiments, the driver circuit DC1 and/or the driver circuit DC2 may also be disposed in the first display region AR1, thereby reducing the range of the first peripheral region DR1 to obtain the effect of a narrow border.

In the present embodiment, the first array substrate 100 comprises a first substrate 110, a first active array 120, an insulating layer 130, a first electrode E1, an insulating layer 140, and a first common electrode C1. The first active array 120, the insulating layer 130, the first electrode E1, the insulating layer 140, and the first common electrode C1 are located between the first substrate 110 and the first opposite substrate 200.

The first active array 120 is located on the first substrate 110. The first active array 120 comprises, for example, scan lines SL1, data lines DL1, common electrode lines (not shown), switching elements (not shown), driving elements (not shown), and other elements.

The insulating layer 130 covers the first active array 120. The first common electrode C1 is located on the insulating layer 130. The insulating layer 140 is located on the first common electrode C1. The first electrode E1 is located on the insulating layer 140 and is electrically connected to the active array 120. In this embodiment, the insulating layer 140 separates the first electrode E1 from the first common electrode C1, so that different voltages may be respectively applied to the first electrode E1 and the first common electrode C1. In the present embodiment, the first electrode E1 is a pixel electrode, and the first common electrode C1 is located between the first electrode E1 and the first substrate 110, but the invention is not limited thereto. In some embodiments, the first electrode E1 is located between the first common electrode C1 and the first substrate 110. In some embodiments, the first common electrode C1 is located on the first opposite substrate 200.

In the present embodiment, the color display panel 10 comprises a plurality of first pixel units PX1. The first pixel units PX1 are located on the first substrate 110 and are located in the first display region AR1. In this embodiment, the size of the first pixel units PX1 is equal to the range surrounded by the corresponding two adjacent scan lines SL1 and the corresponding two adjacent data lines DL1, for example. Each first pixel unit PX1 comprises at least a pixel electrode, such as the first electrode E1.

In this embodiment, the color display panel 10 further comprises a first liquid crystal layer LC1. The first liquid crystal layer LC1 is located between the first array substrate 100 and the first opposite substrate 200. The first liquid crystal layer LC1 comprises a liquid crystal medium. The liquid crystal medium may be liquid crystal molecules or other applicable mediums, but the invention is not limited thereto.

In this embodiment, the color display panel 10 further comprises a color conversion layer 210. The color conversion layer 210 is located between the first array substrate 100 and the first opposite substrate 200. The color conversion layer 210 comprises quantum dots, color filter elements, or other suitable filter elements. In one embodiment, the color conversion layer 210 is disposed on the first opposite substrate 200 at positions corresponding to the first pixel electrodes E1, for example. In some embodiments, the color conversion layer 210 may also be disposed on the first array substrate 100 to form a structure of a color filter element on a color filter on array (COA). In some embodiments, the color conversion layer 210 comprises different color filter patterns, and the second light shielding layer BM2 is disposed between different color filter patterns.

In this embodiment, the color display panel 10 further comprises a first polarizer P1 and a second polarizer P2. The first polarizer P1 is located under the first array substrate 100. The second polarizer P2 is located on the first opposite substrate 200.

Referring to FIGS. 1A and 1C, the switching panel 20 comprises a second array substrate 300 and a second opposite substrate 400. The second opposite substrate 400 overlaps the second array substrate 300 in the first direction D1, wherein the second array substrate 300 comprises a second display region AR2 and a second peripheral region DR2 located on at least one side of the second display region AR2. The second display region AR2 overlaps the first display region AR1 and the first peripheral region DR1 in the first direction D1.

The driver circuit DC3 and the driver circuit DC4 are located in the second peripheral region DR2. The scan lines SL2 are electrically connected to the driver circuit DC3 and extend from the second peripheral region DR2 into the second display region AR2. The data lines DL2 are electrically connected to the driver circuit DC4 and extend from the second peripheral region DR2 into the second display region AR2. Although in this embodiment, the driver circuit DC3 and the driver circuit DC4 are disposed in the second peripheral region DR2, the present invention is not limited thereto. In other embodiments, at least part of the driver circuit DC3 and/or at least part of the driver circuit DC4 may also be disposed in the second display region AR2, thereby reducing the range of the second peripheral region DR2 to obtain the effect of a narrow border.

In the present embodiment, the second array substrate 300 comprises a second substrate 310, a second active array 320, an insulating layer 330, a second electrode E2, a third electrode E3, an insulating layer 340, and a second common electrode C2. The second active array 320, the insulating layer 330, the second electrode E2, the third electrode E3, the insulating layer 340, and the second common electrode C2 are located between the second substrate 310 and the second opposite substrate 400.

The second active array 320 is located on the second substrate 310. The second active array 320 comprises, for example, scan lines SL2, data lines DL2, common electrode lines (not shown), switching elements (not shown), driving elements (not shown), and other elements.

The insulating layer 330 covers the second active array 320. The second common electrode C2 is located on the insulating layer 330. The insulating layer 340 is on the second common electrode C2. The second electrode E2 and the third electrode E3 are located on the insulating layer 340 and electrically connected to the active array 320. In the present embodiment, the insulating layer 340 separates the second electrode E2 from the second common electrode C2, and the insulating layer 340 separates the third electrode E3 from the second common electrode C2. Therefore, different voltages may be applied to the second electrode E2 and the second common electrode C2, and different voltages may be applied to the third electrode E3 and the second common electrode C2. In this embodiment, the second electrode E2 and the third electrode E3 are pixel electrodes, and the second common electrode C2 is located between the second electrode E2 and the second substrate 310 and between the third electrode E3 and the second substrate 310. However, this invention is not limited thereto. In some embodiments, the second electrode E2 and the third electrode E3 are located between the second common electrode C2 and the second substrate 310. In some embodiments, the second common electrode C2 is located on the second opposite substrate 400.

In this embodiment, the switching panel 20 comprises a plurality of second pixel units PX2 and a plurality of third pixel units PX3. The second pixel units PX2 and the third pixel units PX3 are located on the second substrate 310 and are located in the second display region AR2.

The second pixel unit PX2 overlaps the first display region AR1 in the first direction D1. In this embodiment, the size of the second pixel unit PX2 is, for example, equal to the range surrounded by the corresponding two adjacent scan lines SL2 and the corresponding two adjacent data lines DL2. Each second pixel unit PX2 comprises at least a pixel electrode (for example, the second electrode E2). In this embodiment, each second pixel unit PX2 overlaps with a first pixel unit PX1 in the first direction D1, and the size of the second pixel unit PX2 is equal to the size of the first pixel unit PX1, but is not limited thereto. The size of the second pixel unit PX2 may also be larger than the size of the first pixel unit PX1. In other words, the size of the second pixel unit PX2 may be greater than or equal to the size of the first pixel unit PX1.

In this embodiment, at least part of the third pixel units PX3 overlaps the first peripheral region DR1 in the first direction D1, and at least part of the third pixel units PX3 overlaps the first display region AR1 in the first direction D1. In this embodiment, the size of the third pixel unit PX3 is, for example, equal to the range surrounded by the corresponding two adjacent scan lines SL2 and the corresponding two adjacent data lines DL2. The size of the third pixel unit PX3 is greater than or equal to the size of the second pixel unit PX2. In this embodiment, the size of the third pixel unit PX3 is larger than the size of the second pixel unit PX2. Each third pixel unit PX3 partially overlaps the first peripheral region DR1 in the first direction D1 and partially overlaps the first display region AR1. Each third pixel unit PX3 comprises at least a pixel electrode, such as the third electrode E3. In some embodiments, the size of the third pixel units PX3 located in the corners of the second display region AR2 is larger than that of the other third pixel units PX3, but the invention is not limited thereto.

In this embodiment, the area of the first display region AR1 is approximately the total area of all the first pixel units PX1 projected on the first substrate 110. The area of the second display region AR2 is about the total area of all second pixel units PX2 and the third pixel units PX3 projected on the second substrate 310. Since the third pixel units PX3 partially overlaps the first peripheral region DR1, the area of the second display region AR2 is larger than the area of the first display region AR1.

In the present embodiment, the switching panel 20 comprises a second liquid crystal layer LC2. The second liquid crystal layer LC2 is located between the second array substrate 300 and the second opposite substrate 400. The second liquid crystal layer LC2 comprises a liquid crystal medium. The liquid crystal medium may be a liquid crystal molecule or other applicable medium, but the invention is not limited thereto.

In this embodiment, the switching panel 20 further comprises a third polarizer P3 and a fourth polarizer P4. The third polarizer P3 is located under the second array substrate 300. The fourth polarizer P4 is located on the second opposite substrate 400.

In some embodiments, the switching panel 20 further comprises a color conversion layer (not shown), but the invention is not limited thereto.

In the present embodiment, the display device 1 further comprises a diffusion layer D. The diffusion layer D is located between the color display panel 10 and the switching panel 20. In the present embodiment, the diffusion layer D comprises a plurality of scattering particles (not shown). The light emitted from the backlight module (not shown) passes through the switching panel 20 in parallel to the first direction D1, and is further scattered by the scattering particles in the diffusion layer D, so that the light can be dispersed more uniformly, thereby improving the visual effect of the entire display device 1.

Figure 2:
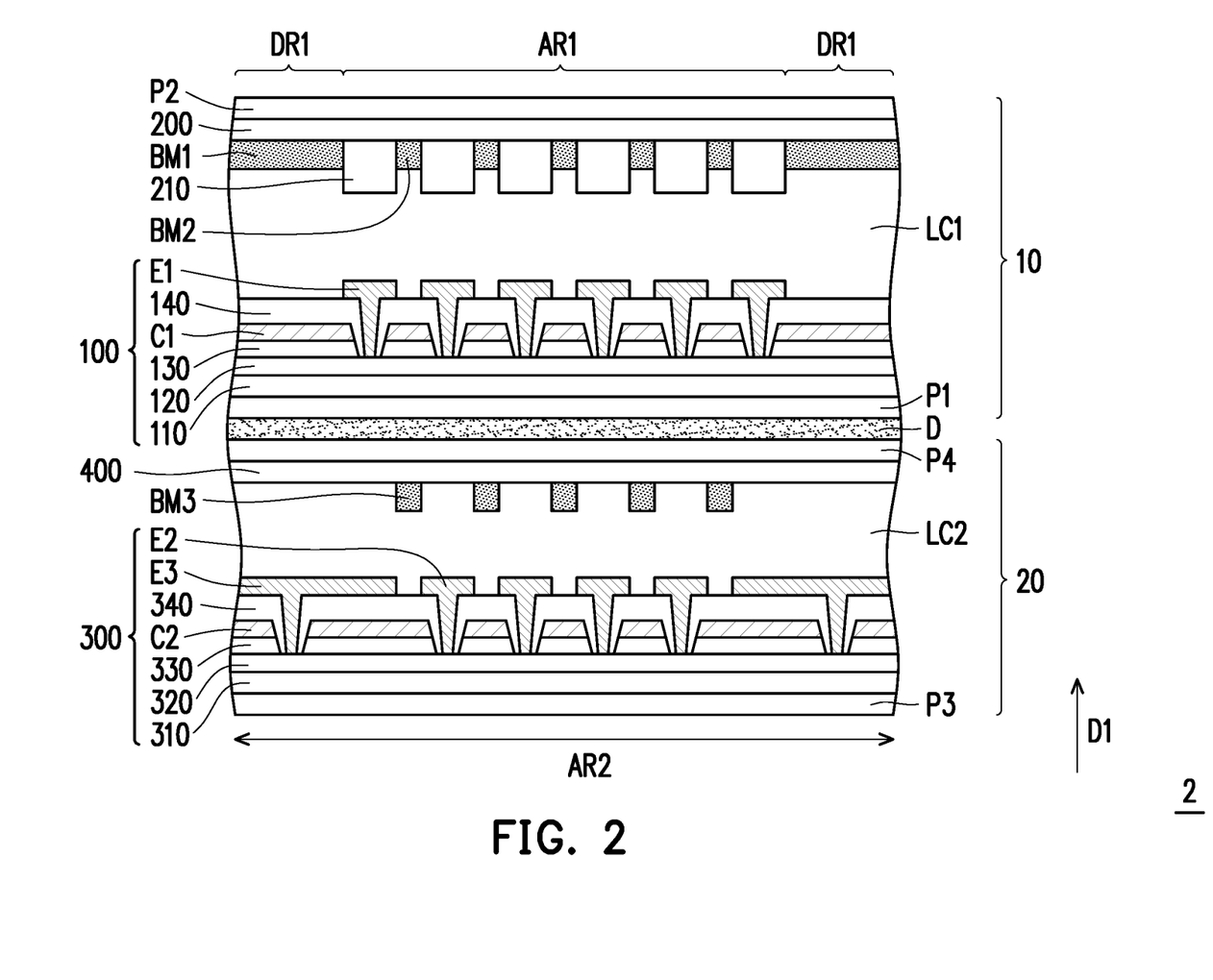
FIG. 2 is a schematic cross-sectional view of a display device according to an embodiment of the present invention.

FIG. 2 is a schematic cross-sectional view of a display device according to an embodiment of the present invention. It must be noted here that the embodiment of FIG. 2 follows the reference numerals and partial content of the embodiments of FIGS. 1A to 1C, wherein the same or similar components are denoted by the same or similar reference numerals, and the illustration of the same technical content is omitted. For the description of the omitted parts, reference may be made to the foregoing embodiments, which will not be described herein.

Referring to FIG. 2, the display device 2 is similar to the display device 1. The difference between them is that a third light shielding layer BM3 is disposed between the second array substrate 300 and the second opposite substrate 400 of the display device 2.

The third light shielding layer BM3 partially overlaps the first display region AR1 and the second display region AR2 in the first direction D1, and corresponds to the positions of the multiple signal lines and the active elements in the second active array 320 for shielding the areas that the liquid crystal media is easily to be disorderedly arranged to obtain good visual effects. The third light shielding layer BM3 is preferably aligned with the second light shielding layer BM2.

Figure 3A:
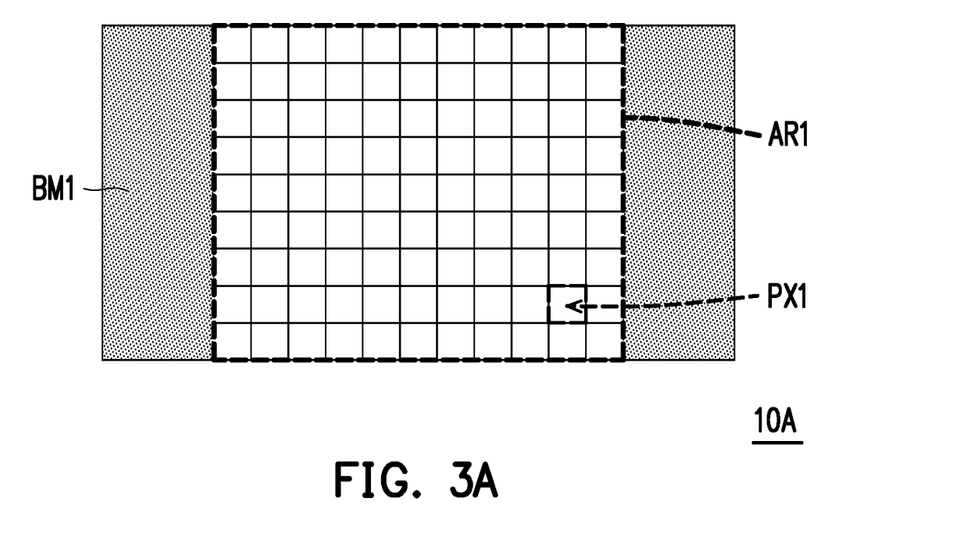
FIG. 3A is a schematic top view of a color display panel according to an embodiment of the present invention.
Figure 3B:
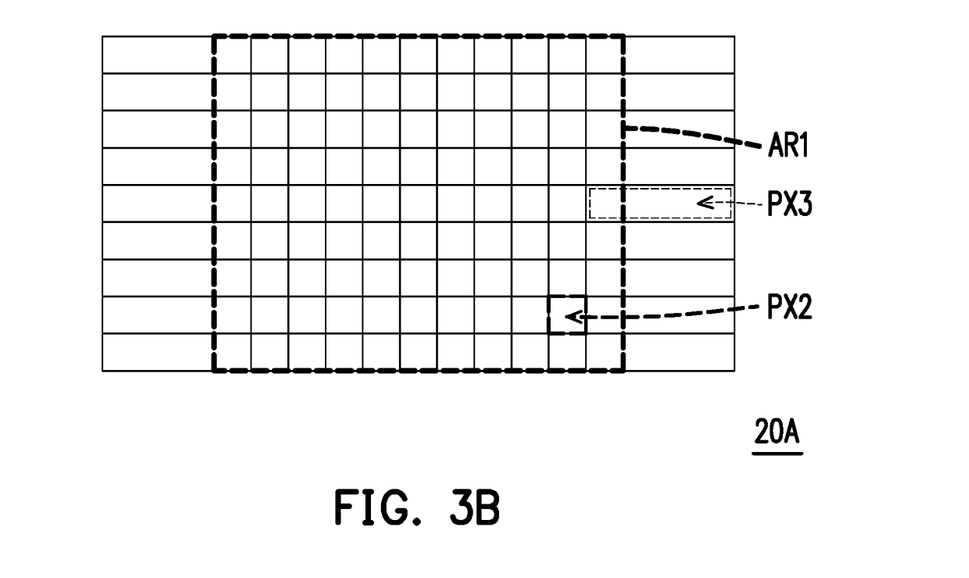
FIG. 3B is a schematic top view of a switching panel according to an embodiment of the present invention.

FIG. 3A is a schematic top view of a color display panel according to an embodiment of the present invention. FIG. 3B is a schematic top view of a switching panel according to an embodiment of the present invention. It must be noted here that the embodiments of FIGS. 3A and 3B follow the reference numerals and partial content of the embodiment of FIGS. 1A to 1C, wherein the same or similar components are denoted by the same or similar reference numerals, and the illustration of the same technical content is omitted. For the description of the omitted parts, reference may be made to the foregoing embodiments, which will not be described herein.

For the convenience of explanation, FIG. 3A illustrates only the first pixel unit PX1 and the first light shielding layer BM1 of the color display panel 10A, and FIG. 3B illustrates only the second pixel unit PX2 and the third pixel unit PX3 of the switching panel 20A.

Please refer to FIG. 3A and FIG. 3B at the same time. The first pixel unit PX1 of the color display panel 10A is located in the first display region AR1 and overlaps the second pixel unit PX2 of the switching panel 20A in the first direction D1.

The third pixel unit PX3 of the switching panel 20A partially overlaps the first light shielding layer BM1 in the first direction D1. In other words, the third pixel unit PX3 of the switching panel 20A partially overlaps the first peripheral region DR1 in the first direction D1 and partially overlaps the first display region AR1. In this embodiment, the smallest rectangle of each approximate square in FIG. 3A is the first pixel unit PX1, and the smallest rectangle of each approximate square in FIG. 3B is the second pixel unit PX2. The smallest rectangles of the leftmost column and the rightmost column in FIG. 3B are the third pixel units PX3. However, the shape of the first pixel units PX1, the second pixel units PX2, and the third pixel units PX3 of the present invention is not limited to a rectangle.

In this embodiment, the number of the first pixel units PX1 is equal to the number of the second pixel units PX2 plus the number of the third pixel units PX3. In this embodiment, the size of the third pixel units PX3 is greater than the size of the second pixel units PX2, and the size of the second pixel units PX2 is equal to the size of the first pixel units PX1.

Based on the above, the resolution of the non-center viewing angle can be maintained by the third pixel units PX3 having a relatively large size, and the visual effect of the display device can be improved.

Figure 4A:
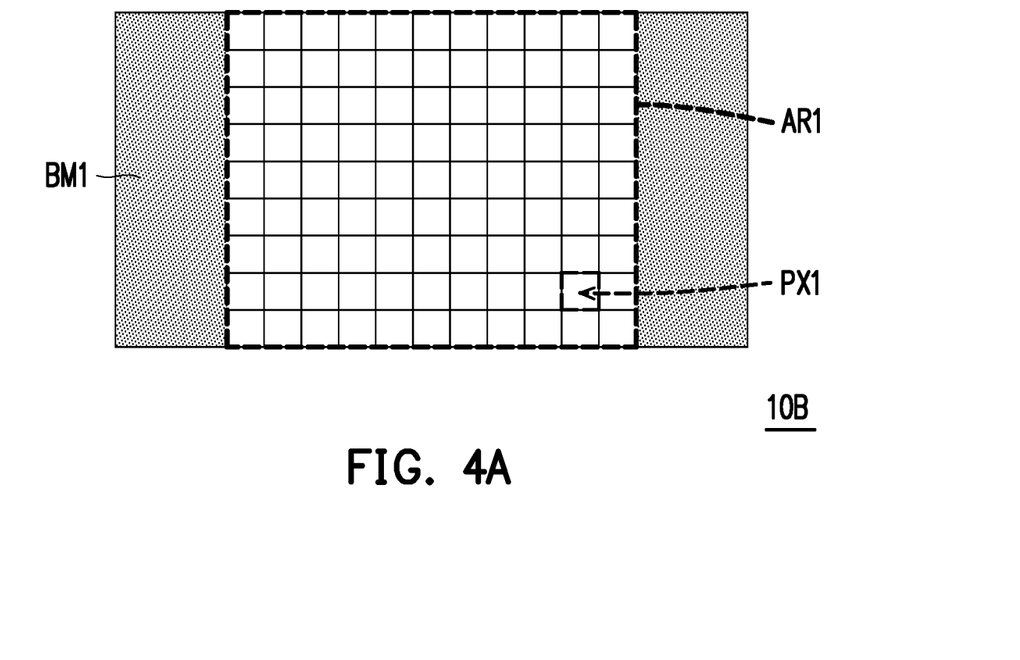
FIG. 4A is a schematic top view of a color display panel according to an embodiment of the present invention.
Figure 4B:
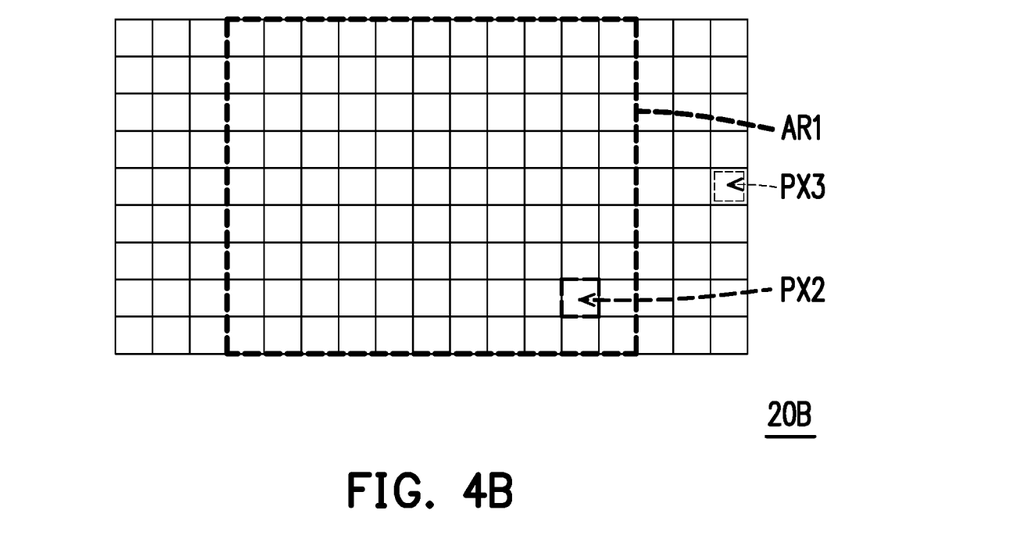
FIG. 4B is a schematic top view of a switching panel according to an embodiment of the present invention.

FIG. 4A is a schematic top view of a color display panel according to an embodiment of the present invention. FIG. 4B is a schematic top view of a switching panel according to an embodiment of the present invention. It must be noted here that the embodiments of FIGS. 4A and 4B follow the reference numerals and partial content of the embodiment in FIGS. 1A to 1C, wherein the same or similar reference numerals are used to represent the same or similar components, and the descriptions of technical content of the same components are omitted. For the description of the omitted parts, reference may be made to the foregoing embodiments, which will not be described herein.

For the convenience of description, FIG. 4A illustrates only the first pixel units PX1 and the first light shielding layer BM1 of the color display panel 10B, and FIG. 4B illustrates only the second pixel unit PX2 and the third pixel units PX3 of the switching panel 20B.

Please refer to FIG. 4A and FIG. 4B at the same time. The first pixel units PX1 of the color display panel 10B is located in the first display region AR1 and overlaps the second pixel units PX2 of the switching panel 20B in the first direction D1. The third pixel units PX3 of the switching panel 20B overlaps the first light shielding layer BM1 in the first direction D1. In other words, the third pixel units PX3 of the switching panel 20B overlaps the first peripheral region DR1 in the first direction D1.

In this embodiment, the number of first pixel units PX1 is less than the number of second pixel units PX2 plus the number of third pixel units PX3. In this embodiment, the size of the third pixel units PX3 is equal to the size of the second pixel units PX2, and the size of the second pixel units PX2 is equal to the size of the first pixel units PX1.

In the present embodiment, the smallest rectangle of each approximate square in FIG. 4A is the first pixel units PX1, and the smallest rectangle of each approximate square in the first display region AR1 in FIG. 4B is the second pixel unit PX2. In FIG. 4B, the smallest rectangle other than the first display region AR1 is the third pixel unit PX3. However, it is not limited that the first pixel unit PX1, the second pixel unit PX2, and the third pixel unit PX3 of the present invention have a rectangular shape.

Figure 5A:
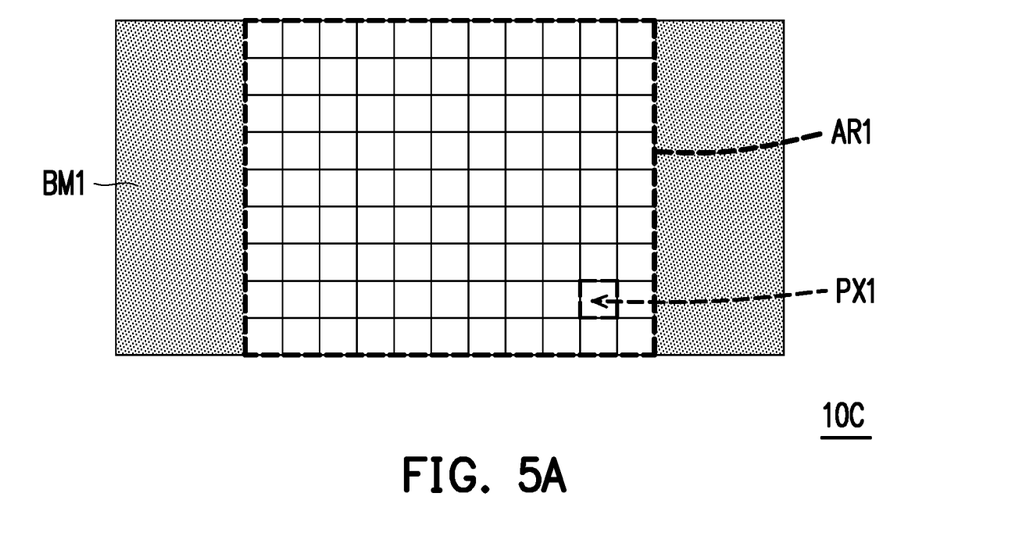
FIG. 5A is a schematic top view of a color display panel according to an embodiment of the present invention.
Figure 5B:
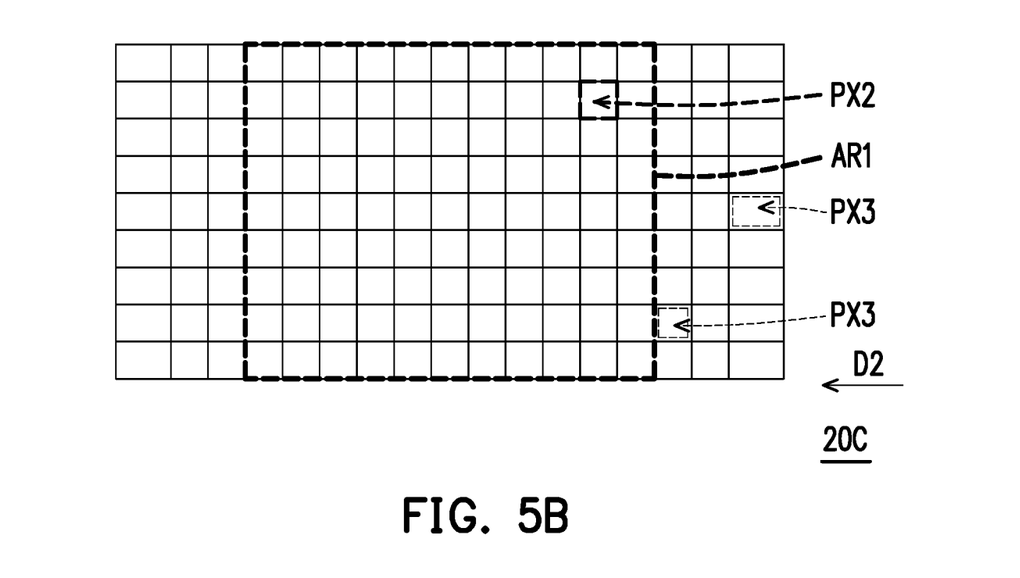
FIG. 5B is a schematic top view of a switching panel according to an embodiment of the present invention.

FIG. 5A is a schematic top view of a color display panel according to an embodiment of the present invention. FIG. 5B is a schematic top view of a switching panel according to an embodiment of the present invention. It must be noted here that the embodiments of FIGS. 5A and 5B follow the reference numerals and partial content of the embodiment of FIGS. 1A to 1C, wherein the same or similar components are denoted by the same or similar reference numerals, and description of the technical content of the same components are omitted. For the description of the omitted parts, reference may be made to the foregoing embodiments, which will not be described herein.

For ease of description, FIG. 5A illustrates only the first pixel units PX1 and the first light shielding layer BM1 of the color display panel 10C, and FIG. 5B illustrates only the second pixel units PX2 and the third pixel units PX3 of the switching panel 20C.

Please refer to FIG. 5A and FIG. 5B at the same time. The first pixel units PX1 of the color display panel 10C are located in the first display region AR1 and overlap the second pixel units PX2 of the switching panel 20C in the first direction D1. The third pixel units PX3 of the switching panel 20C overlaps the first light shielding layer BM1 in the first direction D1. In other words, the third pixel units PX3 of the switching panel 20C overlaps the first peripheral region DR1 in the first direction D1.

In this embodiment, the number of first pixel units PX1 is less than the number of second pixel units PX2 plus the number of third pixel units PX3. In this embodiment, the size of a part of the third pixel units PX3 is equal to the size of the second pixel units PX2, and the size of another part of the third pixel units PX3 is, for example, greater than the size of the second pixel units PX2, but is not limited thereto. In other words, in this embodiment, the size of the third pixel units PX3 that is away from the second pixel units PX2 is larger than the size of the third pixel units PX3 that is close to the second pixel units PX2. The size of the second pixel units PX2 is equal to the size of the first pixel units PX1. In other words, as viewed in the direction parallel to the first direction D1, the size of the third pixel units PX3 superimposed on the first peripheral region DR1 may be gradually changed along a direction away from the first display region AR1 (for example, parallel to the second direction D2 in the figure). As a result, the resolution at a non-center viewing angle can be effectively maintained, thereby improving the overall visual effect of the display device.

In the present embodiment, the smallest rectangle of each approximate square in FIG. 5A is the first pixel unit PX1, and the smallest rectangle of each approximate square in the first display region AR1 in FIG. 5B is the second pixel unit PX2. The smallest rectangle other than the first display region AR1 in FIG. 5B is the third pixel unit PX3. However, it is not limited that the shapes of the first pixel units PX1, the second pixel units PX2, and the third pixel units PX3 of the present invention are rectangular.

Figure 6:
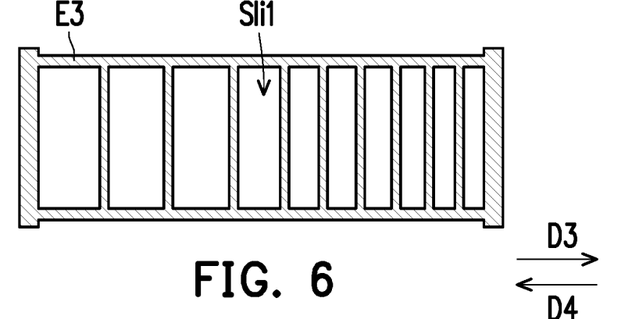
FIG. 6 is a schematic top view of a third electrode of a display device according to an embodiment of the present invention.

FIG. 6 is a schematic top view of a third electrode of a display device according to an embodiment of the present invention. It must be noted here that the embodiment of FIG. 6 follows the reference numerals and partial content of the embodiments of FIGS. 1A to 1C, wherein the same or similar components are denoted by the same or similar reference numerals, and the description of the same technical content is omitted. For the description of the omitted parts, reference may be made to the foregoing embodiments, which will not be described herein.

For the convenience of description, FIG. 6 only shows a schematic top view of the third electrode E3 and the slit Sli1 of the third pixel unit PX3 overlapping the first peripheral region DR1 in the first direction D1. Among them, each third electrode E3 comprises a plurality of slits Sli1.

Referring to FIG. 6, the width of a partial of slits Sli1 near the second pixel units PX2 is smaller than the width of a partial of slits Sli1 away from the second pixel units PX2. The second pixel units PX2 are located in the third direction D3 of the third electrode E3, for example. In other words, the width of the slits Sli1 in the first peripheral region DR1 gradually widens in the fourth direction D4 (the direction away from the first display region AR1). In this way, a visual effect of brightness gradient can be obtained, thereby improving the efficiency of the liquid crystal medium away from the first display region AR1.

In this embodiment, the shape of the slits Sli1 is, for example, a rectangle, but the present invention is not limited thereto.

Figure 7:
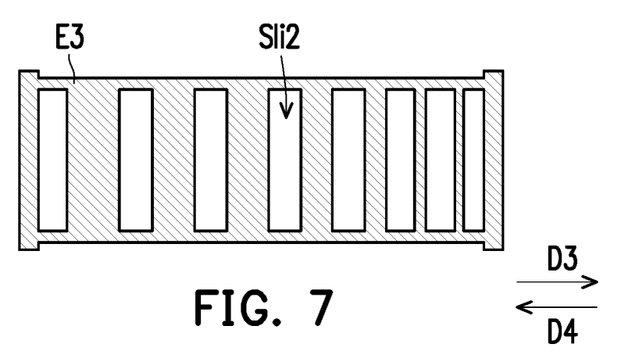
FIG. 7 is a schematic top view of a third electrode of a display device according to an embodiment of the present invention.

FIG. 7 is a schematic top view of a third electrode of a display device according to an embodiment of the present invention. It must be noted here that the embodiment of FIG. 7 follows the component numerals and partial content of the embodiments of FIGS. 1A to 1C, wherein the same or similar components are denoted by the same or similar reference numerals, and the same technical content is omitted. For the description of the omitted parts, reference may be made to the foregoing embodiments, which will not be described herein.

For the convenience of description, FIG. 7 shows only a schematic top view of the third electrode E3 and the slit Sli2 of the third pixel unit PX3 superimposed on the first peripheral region DR1 in the first direction D1. Each of the third electrodes E3 comprises a plurality of slits Sli2.

Please refer to FIG. 7, the density of a partial of slits Sli2 near the second pixel units PX2 is greater than the density of a partial of slits Sli2 away from the second pixel units PX2. The second pixel units PX2 are located in the third direction D3 of the third electrode E3, for example. In other words, the density of the slits Sli2 gradually decreases in the fourth direction D4 (the direction away from the first display region AR1). In this way, a visual effect of brightness gradient can be obtained, thereby improving the efficiency of the liquid crystal medium away from the first display region AR1. In the present embodiment, the shape of the slits Sli2 is, for example, a rectangle, but the present invention is not limited thereto.

Figure 8:
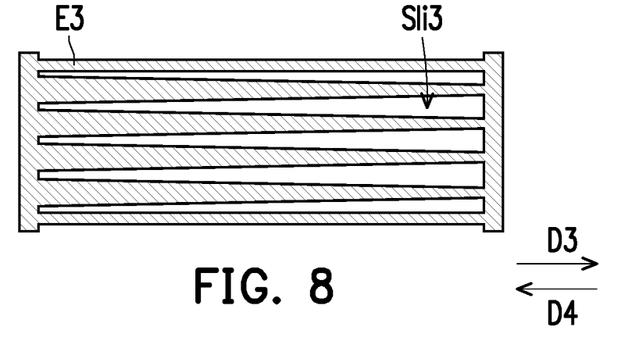
FIG. 8 is a schematic top view of a third electrode of a display device according to an embodiment of the present invention.

FIG. 8 is a schematic top view of a third electrode of a display device according to an embodiment of the present invention. It must be noted here that the embodiment of FIG. 8 follows the component numerals and partial content of the embodiments of FIGS. 1A to 1C, wherein the same or similar components are denoted by the same or similar reference numerals, and the description of the same technical content is omitted. For the description of the omitted parts, reference may be made to the foregoing embodiments, which will not be described herein.

For the convenience of explanation, FIG. 8 only shows a schematic top view of the third electrode E3 and the slit Sli3 of the third pixel units PX3 overlapping with the first peripheral region DR1 in the first direction D1. Each of the third electrodes E3 comprises a plurality of slits Sli3.

Please refer to FIG. 8, the density of a partial of slits Sli3 near the second pixel units PX2 is greater than the density of a partial of slits Sli3 away from the second pixel units PX2. The second pixel units PX2 are located in the third direction D3 of the third electrode E3, for example. In other words, the density of the slits Sli3 gradually decreases in the fourth direction D4 (the direction away from the first display region AR1). In this way, a visual effect of brightness gradient can be obtained, thereby improving the efficiency of the liquid crystal medium away from the first display region AR1. In the present embodiment, the shape of the slits Sli3 is, for example, trapezoidal or triangular, but the present invention is not limited thereto.

Figure 9:
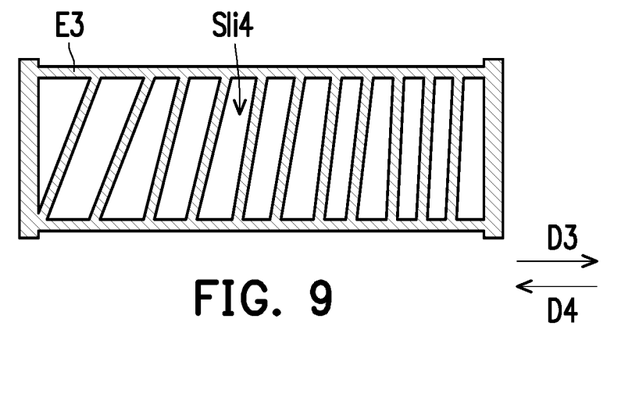
FIG. 9 is a schematic top view of a third electrode of a display device according to an embodiment of the present invention.

FIG. 9 is a schematic top view of a third electrode of a display device according to an embodiment of the present invention. It must be noted here that the embodiment of FIG. 9 follows the reference numerals and partial content of the embodiments of FIGS. 1A to 1C, wherein the same or similar components are denoted by the same or similar reference numerals, and the description of same technical content is omitted. For the description of the omitted parts, reference may be made to the foregoing embodiments, which will not be described herein.

For the convenience of description, FIG. 9 only shows a schematic top view of the third electrode E3 and the slit Sli4 of the third pixel units PX3 superimposed on the first peripheral region DR1 in the first direction D1. Among them, each third electrode E3 comprises a plurality of slits Sli4.

Please refer to FIG. 9. The inclination of a partial of slits Sli4 near the second pixel units PX2 is smaller than the inclination of a partial of slits Sli4 away from the second pixel units PX2. The second pixel units PX2 is located at the first position, for example. The third electrode E3 is in the third direction D3. In other words, the degree of inclination of the slits Sli4 is the degree of inclination in the fourth direction D4 (the direction away from the first display region AR1). In this way, a visual effect of brightness gradient can be obtained, thereby improving the efficiency of the liquid crystal medium away from the first display region AR1. In the present embodiment, the shape of the slits Sli4 is, for example, a quadrangle or a triangle. In other embodiments, the shape of the slits Sli4 may also be another suitable shape as long as the inclination of the slits Sli4 is gradually reduced along the direction away from the second pixel units PX2, and the present invention is not limited thereto.

In summary, the third pixel units of the display device of the present invention overlaps the first peripheral region in the first direction, and the size of the third pixel units is greater than or equal to the size of the second pixel units. The resolution under non-center viewing angle is maintained, thereby improving the problem of distortion of the edges of the image under a large viewing angle. In addition, the third electrodes of the third pixel units of the display device comprise a plurality of slits by gradually changing the width of the slits in a direction away from the first display region, or by the density or the degree of inclination of the slits. The change is gradually reduced away from the direction of the first display region to obtain a visual effect of brightness gradient, thereby improving the efficiency of the liquid crystal medium away from the first display region.

Although the present invention has been disclosed by way of example with reference to the above embodiments, it is not intended to limit the present invention, and any person having ordinary skill in the art can make some changes and changes without departing from the spirit and scope of the present invention. Therefore, the claimed scopes of the present invention shall be subject to the definition of the appended claims.

What is claimed is:
1. A display device, comprising:
   a color display panel, comprising:
      a first array substrate;

a first opposite substrate overlapping the first array substrate in a first direction, wherein the first array substrate having a first display region and a first peripheral region disposed on at least one side of the first display region; and a first light shielding layer overlapping the first peripheral region on the first direction; and a switching panel overlapping the color display panel on the first direction, wherein the switching panel comprises:

a second array substrate; and a second opposite substrate overlapping the second array substrate on the first direction, wherein the second array substrate comprises a second display region overlapping the first display region and the first peripheral region in the first direction, wherein the second array substrate, the second opposite substrate, the first array substrate, and the first opposite substrate are sequentially arranged along the first direction, wherein the first array substrate comprises:

a first substrate; and a plurality of first pixel units disposed on the first substrate and in the first display region, wherein each of the plurality of first pixel units comprises at least a first electrode; and the second array substrate comprises:

a second substrate;

a plurality of second pixel units disposed on the second substrate and in the second display region, wherein the plurality of second pixel units overlap the first display region in the first direction and each of the plurality of second pixel units comprises at least a second electrode; and a plurality of third pixel units disposed on the second substrate and in the second display region, wherein at least a part of the plurality of third pixel units overlap the first peripheral region in the first direction and each of the plurality of third pixel units comprises at least a third electrode, wherein the size of the plurality of second pixel units is larger than or equal to the size of the plurality of first pixel units.

2. The display device of claim 1, wherein a part of the plurality of third pixel units overlap the first display region in the first direction.

3. The display device of claim 1, wherein each of the third electrode comprises a plurality of slits, and a width of a partial of the plurality of slits near the plurality of second pixel units is smaller than the width of a partial of the plurality of slits away from the plurality of second pixel units.

4. The display device of claim 1, wherein each of the third electrode comprises a plurality of slits, and a density of a partial of the plurality of slits near the plurality of second pixel units is greater than a density of a partial of the plurality of slits away from the plurality of second pixel units.

5. The display device of claim 1, wherein each of the third electrode comprises a plurality of slits, and an inclination of a partial of the plurality of slits near the plurality of second pixel units is smaller than the inclination of a partial of the plurality of slits away from the plurality of second pixel units.

6. The display device of claim 1, wherein the size of the plurality of third pixel units is larger than or equal to the size of the plurality of second pixel units.

7. The display device of claim 1, wherein the size of a partial of the plurality of third pixel units away from the plurality of second pixel units is greater than the size of a partial of the plurality of third pixel units near the plurality of second pixel units.

8. The display device of claim 1, wherein the first electrodes, the second electrodes and the third electrodes are pixel electrodes, and the display device further comprises:

at least a first common electrode located between the first substrate and the first opposite substrate; and at least a second common electrode located between the second substrate and the second opposite substrate.

9. The display device of claim 1, further comprising:

a diffusion layer disposed between the color display panel and the switching panel.

10. The display device of claim 1, further comprising:

a first liquid crystal layer disposed between the first array substrate and the first opposite substrate;

a color conversion layer disposed between the first array substrate and the first opposite substrate; and a second liquid crystal layer disposed between the second array substrate the second opposite substrate.

* * * * *